United States Patent [19]

Salama

[11] Patent Number: 5,039,255
[45] Date of Patent: Aug. 13, 1991

[54] TERMINATION FOR KINKABLE ROPE

[75] Inventor: Mamdouh M. Salama, Ponca City, Okla.

[73] Assignee: Conoco Inc., Ponca City, Okla.

[21] Appl. No.: 613,428

[22] Filed: Nov. 13, 1990

[51] Int. Cl.⁵ ............ B63B 21/50; E02B 17/00; F16L 27/04; F16L 27/10
[52] U.S. Cl. ............ 405/224; 405/202; 114/265; 403/133
[58] Field of Search ............ 114/264, 265, 294, 311; 403/133, 135, 225, 226; 405/195, 202, 203, 204, 224, DIG. 8; 156/166

[56] References Cited

U.S. PATENT DOCUMENTS

| Re. 32,274 | 11/1986 | Burchett | 114/297 |
|---|---|---|---|
| 3,085,305 | 4/1963 | Colombet et al. | 403/268 X |
| 4,126,498 | 11/1978 | Donecker | 156/86 |
| 4,248,549 | 2/1981 | Czerewaty | 405/224 |
| 4,391,554 | 7/1983 | Jones | 405/224 |
| 4,432,670 | 2/1984 | Lawson | 405/224 |
| 4,439,055 | 3/1984 | Quigg et al. | 403/330 |
| 4,611,953 | 9/1986 | Owens | 405/224 |
| 4,701,076 | 10/1987 | Chiu et al. | 405/224 |
| 4,746,247 | 5/1988 | Arlt, III et al. | 405/224 |
| 4,784,529 | 11/1988 | Hunter | 405/227 |
| 4,838,736 | 6/1989 | Moore | 405/224 |
| 4,923,337 | 5/1990 | Huard | 405/224 |

*Primary Examiner*—Dennis L. Taylor
*Assistant Examiner*—John A. Ricci
*Attorney, Agent, or Firm*—A. Joe Reinert

[57] ABSTRACT

A Kevlar ® rope termination in which the rope is passed through an opening in a tension leg termination, is divided and laid over a rigid pin, being sealed around the pin with a resin. A flexible bearing member is located between the rope covered pin and a rigid support member contiguous with the inside of the termination, adjacent to the opening so that the rope covered pin can easily rotate within the bearing member without kinking the rope.

14 Claims, 1 Drawing Sheet

TERMINATION FOR KINKABLE ROPE

BACKGROUND OF THE INVENTION

Parallel lay Kevlar ® ropes have been proposed for use as mooring lines for tension leg platforms. For this type of rope construction, two terminations are usually used, a cone and spike type and a potted termination. The termination is usually large in size and is fabricated of metal causing a large change in bending stiffness betweeen termination and the rope. Any uncontrolled movement of the termination during handling and installation imposes a large bending of the rope end near the termination. Since Kevlar ® lacks high strength in compression, bending causing kinking of the fibers results in a major reduction of the rope strength.

It is desirable to provide a termination for kinkable ropes such as Kevlar ® where the rope would be free to rotate and to move laterally whereby kinking of the rope would not occur.

PRIOR ART

U.S. Pat. No. 4,126,498 to Donecker discloses a lightweight boot for wire rope terminations. The boot is placed on the surface of a wire rope and secured to the socket nose of the termination to seal the termination-wire rope interface. As polyolefin heat shrinkable tube is placed over the head of the boot to seal the wire rope-boot interface.

U.S. Pat. No. 4,248,549 issued to Czerewaty discloses a base for anchoring a flexible line having an upwardly flared opening. The flexible line contains a plurality of sleeves which are spaced apart along the length of the line and are clamped about the line. The inner surfaces of the sleeves are made of a ductile material such as hard rubber. The sleeves are of a slightly less diameter than the smallest portion of the flared base.

U.S. Pat. No. 4,391,554 to Jones discloses a mooring system for a tension leg platform in which the upper portion of the tension leg is supported with a universal, flexible connector. The universal, flexible connector includes a spherical elastomeric bearing which permits the connector to conduct axial forces through the tension legs while it permits pivotal motion of the lower tension leg around the connector.

U.S. Pat. No. 4,432,670 issued to Lawson discloses a combination tension connector and flex joint for the tension elements of a leg of a tension leg platform. The flex joint is of generally a ball and socket type with the ball member connected to the lower end of the tension element and the socket member connected to an upwardly projecting annular portions of the male member of the connector.

U.S. Pat. No. 4,439,055 issued to Quigg et al. discloses a flexible joint for securing a tension leg comprising a pivotal member, a fixed member and an elastomeric bearing positioned between the pivotal member and the fixed member. The elastomeric bearing permits movement of the tension leg with minimum transmittal of bending forces.

U.S. Pat. No. 4,611,953 issued to Owens discloses a bottom connector comprising a first or lower body member which is fixed to prevent it from swiveling and an upper body member which is connectable to tendons and is separated by a flexible element which permits rotational movement between the upper body member and the lower body member. This arrangement also connects the upper and lower body members together and permits the upper body members to move due to movement induced in the tendons by the platform.

U.S. Pat. No. 4,701,076 issued to Chiu et al. discloses a terminator assembly in which a hawse pipe extends downwardly from adjacent an upper support on the floating structure and is supported by lower support. Tension members utilized from mooring the floating structure extend downwardly from adjacent the upper support through the hawse pipe and a lower end of the tension member is adapted for connection to the floor of the body of the water. A locking devise is connected to an upper portion of each tension member to maintain the tension member in tension by acting upon the upper portion of the hawse pipe to transfer the vertical loads through the hawse pipe to the lower support on the floating structure.

U.S. Pat. No. 4,746,247 issued to Arlt III et al. discloses a flex joint and latch assembly which is comprised of a pod and an elastomeric bearing assembly. The elastomeric bearing assemly is formed of alternating layers of elastomeric material and rigid plates curved with a center of curvature on a pivot point. The elastomeric bearing assembly allows the tension member to pivot about the pivot point.

U.S. Pat. No. 4,784,529 issued to Hunter discloses a flex connector for a tendon in which the lower end of the tendon has a frustoconical form having a conical upper surface which engages an inner bearing of the flex bearing assembly. The inner bearing ring is attached to an annular flex bearing for translating compressive loading outwardly to an outer bearing ring which is in engagement with a flange. The flex bearing assembly permits angular deviation of the mooring tendon away from a strictive vertical position.

U.S. Pat. No. Re32,274 reissued to Burchett discloses a flex joint assembly in which a tether line having a lower flared end is held to the interior surface of a locking ring by an elastomer and metal assembly. The flared lower end of the tendon has a cup shaped inner surface that is supported by a spherical seat which is attached to the anchor body. The purpose of the flex joint assembly which is resiliently deformable is to permit limited angular movement of the tether line relative to the anchor body.

THE INVENTION

The invention comprises a termination for a kinkable rope comprising a hollow termination body having an opening through which the kinkable rope is freely extended with the end of the rope dividing, extending around and covering a rigid pin inside said termination. A rigid support member is provided inside and contiguous with the termination body adjacent the opening in the termination body and is positioned opposite the rope covered pin. A flexible member is provided between and in contact with both the rigid support member and the rope covered pin whereby the rope covered pin can easily rotate within the bearing member without kinking the rope. The rope is potted around the pin with resin to hold it in place. A flexible member may be provided to seal the space between the rope and the opening in the termination body.

DETAILED DESCRIPTION OF THE INVENTION

Figure 1:
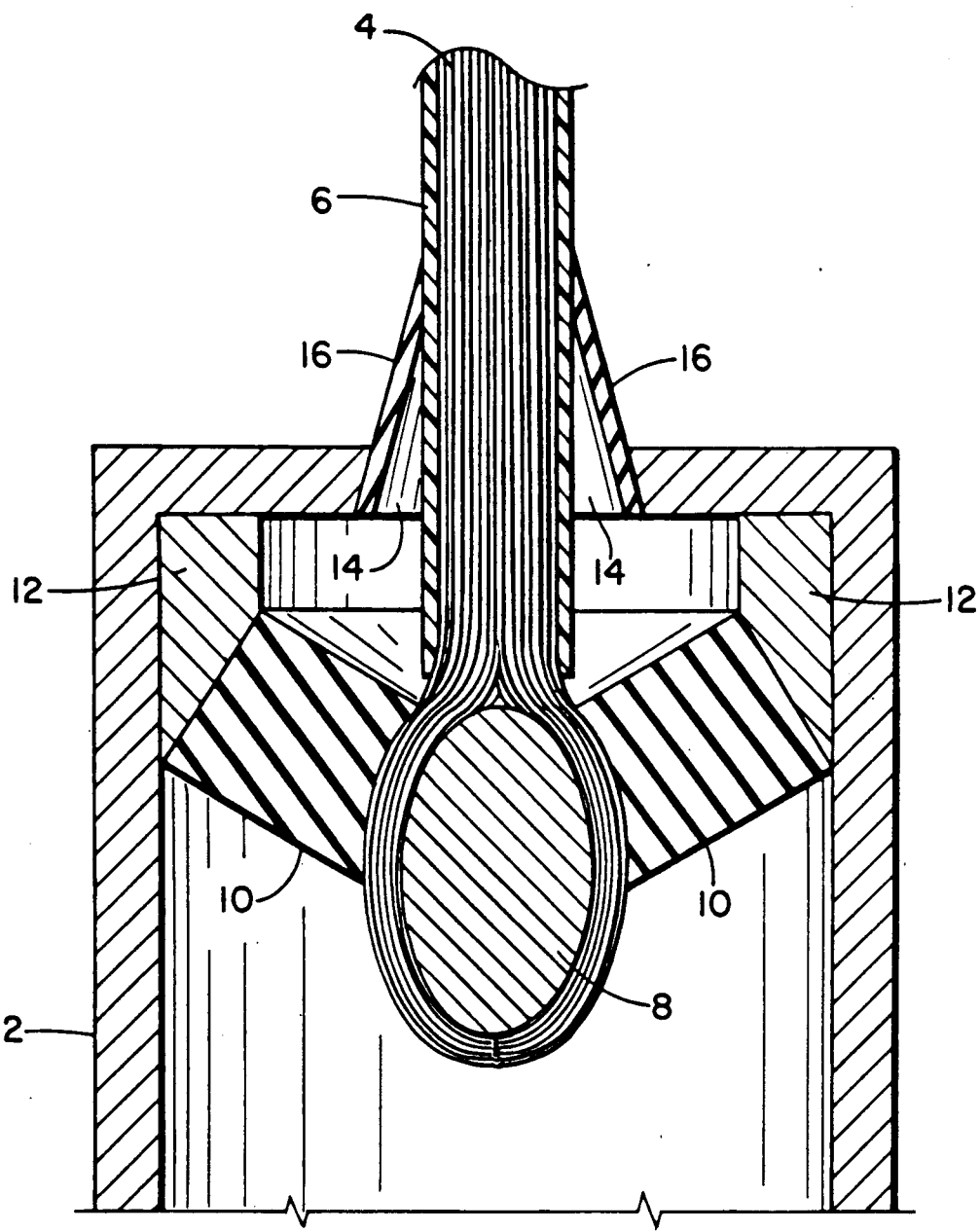
FIG. 1 is a a partial schematic cross-section of a termination illustrative of the invention.

The invention is best described by reference to FIG. 1. This figure illustrates a termination body 2 which is usually constructed of metal or other rigid material. The illustration is specific to a downhole termination in that the kinkable rope 4 exits the termination in an upwardly direction. Kinkable rope 4 in this instance, a Kevlar ® rope enters termination 2 through an opening 14 which is of sufficient size to allow free passage of rope 4 and also lateral movement of rope 4 within the opening. Within termination 2, the fibers of rope 4 are separated and uniformly laid over a rigid pin 8 which is ovoid or spherical in shape. The fibers of rope 4 are attached to or potted around rigid member 8 with a suitable resin material such as vinyl ester, epoxy or a thermoplastic or thermosetting resin, which is in contact with rigid member 8 and interspersed through the rope fibers. The fibers of rope 4 are shown meeting at the bottom of rigid member 8 however, it is not necessary that the fibers entirely surround this member.

The termination of the invention may be used with any kinkable rope, however, it finds special application with ropes made of aramid fiber where the fibers are laid in parallel and the fibers are held together with an outer sheath or covering. Examples of aramid polymers are Kevlar ® polymer which is made by Du Pont and Exten ® polymer which is manufactured by Goodyear. The kinkable rope will normally contain thousands of fibers of very small diameter, e.g. from about 0.4 to about 3.0 mils. Parallel lay aramid fiber ropes are weak in compression and in the past, handling of such ropes has been difficult without extreme care and rigorous support of the ropes to avoid bending at the termination. Ropes of other fibers such as glass fibers, ceramic fibers or other polymer fibers such as nylon which are not as kinkable as the aramid fibers may also be used in the termination of the invention.

Referring again to the drawing, the fibers of the Kevlar ® rope are held together with an outer cover or sheath 6. Another purpose of the sheath around the fibers is to protect the fibers from wear friction, mechanical damage and chemical action. For this reason, it is desirable to use a cover which has a low coefficient of friction, is wear resistant and is resistant to chemicals. Materials such as Rilsan ® which is sold by ATO Chem, and Telfon ®, Nylon or Hytrel ® which are sold by Du Pont may be used for this purpose. Preferably outer cover or sheath 6 is extended around the fibers which cover rigid pin 8.

Rigid pin 8 which is covered by the Kevlar ® rope may be made of any suitable material which does not flex and retains its shape. Steel, titanium or any noncorrosive metal is appropriate for this use. In addition, other materials such as hard rubber may be used for rigid pin 8.

The rope covered rigid pin 8 is held in place by a flexible bearing member 10 which encircles and is in contact with the outer fibers of the rope surrounding rigid member 8. Flexible bearing member 10 is constructed of materials which allow rotation of rope covered pin 8. A particularly suitable material is an elastomer, such as rubber or rubber reinforced with metal. Flexible bearing member 10 is supported by rigid support member 12 which is contiguous with the inside of the surface of termination 2 and is positioned adjacent opening 14 in such termination. Rigid support member 12 which may be separate from termination 2 or an integral part thereof is appropriately constructed of the same material as termination 2.

A frustroconical seal 16 is positioned in opening 14 in termination 2 and encircles Kevlar ® rope 4 in contact with the outer cover 6. The purpose of this seal is to prevent foreign material from entering the termination and possibly adversely affecting the free movement of the rope 4 within the termination.

Flexible seal 16 may be formed of any suitable material such as rubber which is resistant to sea water and is freely flexible with movement of rope 4. Flexible seal 16 may be affixed to termination 2 with a suitable adhesive or by other suitable means.

Only the portion of termination 2 which contains rope covered pin 8 is shown in FIG. 1. The remainder of the termination which is configured to effect attachment of the termination either at the ocean floor or at the tension leg platform is constructed using any suitable design disclosed in the art. Such design and attachment features do not constitute a part of the present invention. Termination 2 may be constructed lin any suitable shape or configuration which allows rotation and some lateral movement of rope 4. Preferably, termination 2 has a hollow cylindrical shape which simplifies the construction of rigid suppport member 12.

The assembled termination may be used for anchoring the rope on the ocean floor and also for attaching the rope to the tension leg platform. The termination may be attached at a bottom anchor on the ocean floor or at the top to the platform in any suitable manner known to those in the art. For example, the termination may be attached by keyhole latching or by using a side entry opening such as shown in U.S. Pat. Nos. 4,746,247 and 4,784,529 which are hereby incorporated by reference.

In operation, if there is any rotary movement of termination 2 or rope 4, the rope covered rigid pin 8 rotates within flexible bearing member 10 to relieve bending or kinking stresses in the fibers of the rope. Similarly, tkhe rope is free to move laterally and thus avoid stresses on the rope fibers.

When attached to a tension leg platform, rope 4 is normally held in tension which forces flexible bearing member 10 against rigid support member 12. In order to assure that flexible bearing member 10 remains in the appropriate position, it may be desirable to affix this member to rigid support member 12 with a suitable adhesive or by other suitable means.

While certain embodiments and details have been shown for the purpose of illustrating the present invention, it will be apparent to those skilled in the art that various changes and modifications may be made herein without departing from the spirit or scope of the invention.

I claim:

1. A termination for a kinkable rope comprising in combination
   (a) a hollow termination body having an opening,
   (b) a kinkable rope extending freely through said opening and the end of said rope dividing, extending around and covering a rigid pin inside said termination body,
   (c) a rigid support member inside and contiguous with said termination body adjacent the opening and spaced opposite the rope covered pin; and
   (d) a flexible bearing member between and in contact with both the rigid support member and the rope covered pin whereby the rope covered pin can easily rotate within the bearing member without kinking the rope.

2. The termination of claim 1 in which the kinkable rope is an aramid fiber rope.

3. The termination of claim 2 in which the aramid fiber rope has a plastic jacket.

4. A termination for a kinkable rope comprising in combination,
   (a) a hollow metal cylindrical termination body having an opening,
   (b) a kinkable rope extending freely through said opening and the end of said rope dividing, extending around and covering a rigid pin inside said termination,
   (c) a metal support member inside and a part of said termination body adjacent the top opening and spaced opposite the rope covering pin, and
   (d) a flexible bearing member between and in contact with both the metal support member and the rope covered pin whereby the rope covered pin can easily rotate within the bearing member without kinking the rope.

5. The termination of claim 4 in which a flexible member is provided to seal the space between the rope and the opening in the termination body.

6. The termination of claim 5 in which the rope is potted around the pin with resin.

7. The termination of claim 6 in which the pin is ovoid in shape.

8. The termination of claim 6 in which the pin is spherical in shape.

9. An aramid fiber rope termination comprising in combination,
   (a) a hollow cylindrical termination body having a circular opening,
   (b) an aramid fiber rope extending freely through said opening and the end of the rope dividing, extending around and covering a rigid pin inside said termination body,
   (c) a circular rigid support member inside and contiguous with said termination body adjacent the top opening and spaced opposite the rope covered pin; and
   (d) a flexible circular bearing member between and in contact with both the rigid support member and the rope covered pin, whereby the rope covered pin can easily rotate within the bearing member without kinking the rope.

10. The termination of claim 9 in which the aramid fiber rope is potted around the pin with a resin.

11. The termination of claim 10 in which the pin is ovoid in shape.

12. The termination of claim 10 in which the pin is spherical in shape.

13. The termination of claim 10 in which a flexible member is provided to seal the space between the aramid fiber rope and the opening in the termination body.

14. The termination of claim 13 in which the aramid fiber rope has a plastic jacket.

* * * * *